(No Model.)
E. G. ACHESON.
MANUFACTURE OF GRAPHITE.
No. 568,323.            Patented Sept. 29, 1896.
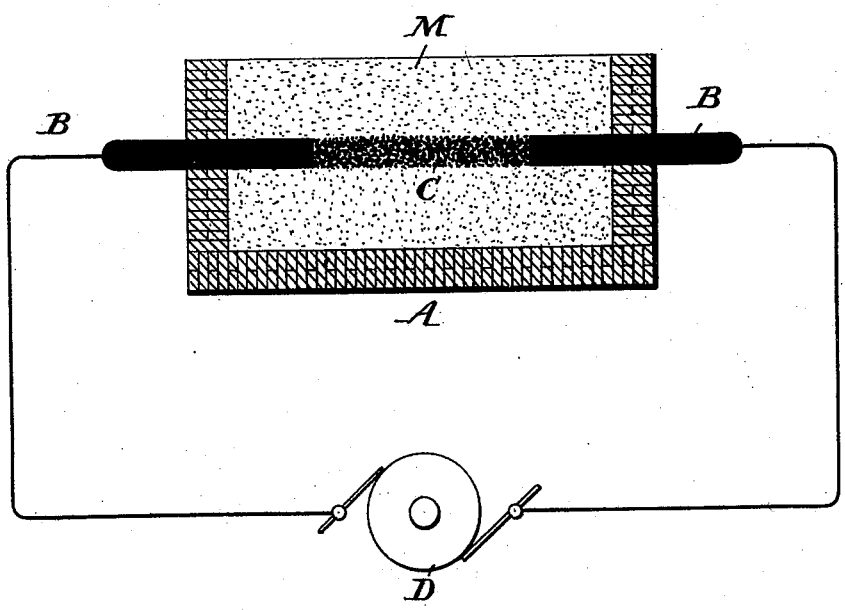
Witnesses
Jno. G. Hinkel
D. A. Hargrieve
Inventor
Edward G. Acheson
by Foster Freeman
Attorneys

UNITED STATES PATENT OFFICE.

EDWARD GOODRICH ACHESON, OF MONONGAHELA CITY, PENNSYLVANIA.

MANUFACTURE OF GRAPHITE.

SPECIFICATION forming part of Letters Patent No. 568,323, dated September 29, 1896.

Application filed December 27, 1895. Serial No. 573,523. (Specimens.)

*To all whom it may concern:*

Be it known that I, EDWARD GOODRICH ACHESON, a citizen of the United States, residing at Monongahela City, in the county of Washington and State of Pennsylvania, have invented certain new and useful Improvements in the Manufacture of Graphite, of which the following is a specification.

My invention relates to the production of graphite from any of the cheap and common forms of carbonaceous materials, such as mineral coal, coke, charcoal, gas-carbon, and carbids and the like; and it has for its object to provide a process or method of cheaply and practically producing pure graphite; and it may be said to consist, generally stated, in the separation or disassociation or conversion of the element carbon, when combined with one or more other elements, into the form of pure graphite.

In converting carbon in its ordinary conditions as found in commerce and in nature into pure graphite by subjecting the carbonaceous material to a high temperature, such as is obtained in an electric furnace, it would naturally seem that the purer the carbon used in charging the furnace the more abundant would be the yield, and it would perhaps be generally considered that there was a direct transformation or conversion of the carbon into graphite. I have discovered that such is not the case, and that the percentage of graphite produced by highly heating pure carbon in an electrical furnace is insignificant and impracticable. I have also discovered that in order to produce pure graphite from carbonaceous materials there is an indirect conversion, and that the act of formation of the graphite is more in the nature of an act of disassociation of the carbon from its combination with other materials than a conversion of the ordinary carbon into graphite, and that as a preliminary step the carbon has to be combined chemically with some other material. Thus I have found that if the carbonaceous material or carbon used in the process contain a considerable proportion of mineral matter, or if it is mixed with a certain proportion of an oxid or oxids, such as silica, clay, alumina, magnesia, lime, or oxid of iron, &c., and subjected to the treatment substantially as hereinafter set forth, the yield of graphite is enormously increased and the product is most satisfactory.

In carrying out my invention I have found it necessary to make use of some sort of an electric furnace, and in the accompanying drawing I have indicated the construction and arrangement of one form which I have found very satisfactory.

The drawing represents a longitudinal vertical section through the center of the furnace A, built, preferably, of fire-brick.

Carbon rods or electrodes B B, to be connected with the source of electric energy D, pass through the end walls of the furnace and conduct the electric current thereto, there being, preferably, a granular carbon core C, which extends the length of the furnace between the carbon rods, and this core is surrounded by the mixture M, of carbonaceous material and oxid or oxids, out of which mixture the graphite is to be produced.

With this general statement I will now proceed to describe my process or method of producing graphite, and I will first describe it, using for the purpose a mixture of carbon and silica. The mixture M in this case is composed of powdered coke, sand, salt, and sawdust, the coke forming about fifty per cent., by weight, of the mixture, and these materials are thoroughly mixed and introduced into the electric furnace surrounding the core of granular coke or other form of conducting carbon, which is of sufficient size to conduct the current through the mixture at the beginning of the operation and until the graphite is formed in sufficient quantity to act as a conductor of the current. The furnace being thus prepared with this material, the current is turned into it with an amperage sufficient to impart to the core the requisite heat. As the temperature rises the resistance of the core decreases, and thereby more current passes through it. The size of the core and the current strength must be sufficient and so proportioned as to raise the temperature of the core to a point where the portions of the mixture or charge immediately surrounding it will be subjected to the chemical and other changes necessary for the production of the graphite out of the carbon or coke contained in the mixture of carbon and silica. As the temperature of the core rises the heat radiating therefrom passes into the mixture, and the carbon or portions thereof unite with the silicon of the sand to form a carbid of silicon. When this chemical combination takes place, there is formed around the core a layer of amorphous and crystalline carbid of silicon or silicide of carbon, which in its crystalline form is called "carborundum," and as this process continues this layer or zone of carborundum is gradually increased.

Upon continuing the application of the electric current, producing a very high temperature, much higher than is necessary for the formation of the silicide of carbon or carborundum, the carbon is disassociated or separated from the carbid of silicon into the graphitic form, while the silicon is volatilized and passes off in the form of vapor. As the destruction of the carbid goes on and the graphite is formed around the core the graphite becomes a conductor and the core is increased as the graphite is formed, so that the intense heat necessary to the production of the graphite is transmitted to the surrounding carbid, and more carbid is destroyed and graphite deposited on the core until the graphite formation has extended outward to a point so close to the walls of the furnace as to endanger them from the intense heat produced.

It will be observed that the above process resembles in some respects my process of making carbid of silicon or carborundum, as set forth in my Patent No. 492,767, dated February 28, 1893, but from this it differs materially in several particulars. In the first place, in order to produce the graphite the core is raised to a very much higher temperature, and in fact it is absolutely essential that the temperature be sufficiently high to destroy the carbid of silicon by separating or eliminating the carbon therefrom and volatilizing the silicon. Furthermore, as the graphite is formed the diameter of the core forming the conductor for the electric current is continuously enlarged, the finished product or the graphite formed constituting a practical extension of the core itself. In the making of carborundum, on the other hand, the temperature of the core must not go above a certain limit, and this limit is much below the point at which the graphite is formed. Furthermore, the diameter of the core is not increased, the finished product—that is, the carbid of silicon—being found immediately surrounding the core both in its crystalline and amorphous forms, the latter being technically known as "white-stuff."

From the above it will be seen that my improved method or process of producing graphite includes the use of an impure mixture of carbonaceous material and large quantities of impurities, (preferably in the form of an oxid;) that this mixture is then heated to a certain degree until a chemical union is formed between the carbon of the mixture and the elementary body of the impurity, as the silicon; that the heat is then increased until the chemical union theretofore produced is ruptured and the elements disassociated, the carbon being deposited in the form of graphite, and the elementary body, as silicon, passing off in the form of vapor. In other words, I have found that there is not a direct conversion of the carbon of the coke or other carbonaceous material into graphite, but there is a separation of the carbon from a definite compound. My invention may thus be said to embody a complete cycle, by means of which pure carbon in its amorphous condition is converted into free pure carbon in its graphitic form, and in accomplishing this the amorphous carbon is first caused to form a chemical union with one or more elementary bodies, as the silicon, and this chemical compound is then disassociated or separated into its elements, the carbon assuming the graphitic form and the elementary body, as the silicon, being volatilized.

While I have thus described the process as being a continuous one from the mixture of the carbonaceous material and oxid, it is evident that I can first form the carborundum or carbid of silicon at one operation and then charge the furnace with the carbid of silicon, either in its crystalline or amorphous conditions, and, heating it to a much higher temperature than that at which the carbid was formed, can disassociate the elements forming the compound, separating out the carbon in its graphitic form.

While I have thus described my process when used with a mixture of carbonaceous material and silica, I can use lime or any other oxid or oxids mixed with the carbonaceous material, and the process can then be carried out in substantially the manner above described.

While I have found that a proportion of fifty (50) parts by weight of coke and fifty (50) parts by weight of silica and other materials will give good results, yet I do not limit myself to these proportions either when silica is used or when any of the other oxids are used with the carbonaceous material.

The materials forming the mixture are preferably in a pulverulent or granular form, and when they are not naturally so they may be ground or crushed to the desired size.

In carrying out the process above described, while I have not been able to determine with absolute certainty the chemical or other changes which occur in the furnace, there is every reason to believe, and I am of the opinion, that as the temperature rises in the furnace, due to the passage of the electric current, the carbon is first united with the elementary silicon, calcium, aluminium, or other metal of the oxid to form a carbid, and as the process continues and a still higher temperature is reached the carbon of the carbid is set free, owing to the volatilization of the element combined therewith, and upon being set free at this very high temperature it assumes the graphitic form. The more or less porous form in which the graphite is thus obtained seems also to point to such a volatilization.

When the operation is finished, the graphite is separated from the remaining material, the core, and the unconverted mixture, and may then be graded or sorted like native graphite.

I have found that when in carrying out this process a carbonaceous material is used containing an unusual amount of ash the oxid added should be correspondingly diminished, and if the carbonaceous material is so impure as to contain more than the requisite proportion of foreign matter a proper charge may be made by the addition to such impure carbonaceous material of a sufficient amount of ordinary hard coal, coke, or the like. I have found it also advisable to use a carbonaceous material containing as little volatile matter as practicable, as when such material is present energy is wasted on destructive distillation.

Instead of the oxids of course I may use the ternary oxy-salts, such as the silicates, which for my purpose amount to a mixture of oxid of silicon and oxids of metals.

Various strengths and conditions of current may be used. As an example, with the graphite furnace indicated, having a core seven feet long by four inches wide, composed of granular coke or carbon, the current at starting is about six hundred and fifty volts and fifty amperes. As the graphite is formed and becomes a conductor, extending the core, there is a change, say, to one hundred volts and one thousand amperes before the completion of the run or operation and the production of the entire amount of graphite. This will serve as illustrative of the requirements of the process.

What I claim is—

1. The method of producing artificial graphite, consisting in electrically subjecting a carbid to a temperature sufficiently high to drive off and volatilize the non-carbon constituent and separate the combined carbon in the form of graphite, substantially as described.

2. The method of producing artificial graphite, consisting in heating a combination of two or more elementary substances, one of which is carbon, without effecting fusion of the mass, to a temperature sufficiently high to cause the combined carbon to separate in the form of graphite, substantially as described.

3. The method of producing artificial graphite, consisting in subjecting a carbid to the action of an electric current and thereby decomposing it and causing the combined carbon to separate in the form of graphite, substantially as described.

4. The method of producing artificial graphite, consisting in electrically heating a mixture of carbon and one or more oxids to a temperature sufficiently high to cause a chemical reaction between the constituents, and then continuing the heating and thereby causing the combined carbon to separate in the form of graphite, substantially as described.

5. The method of producing artificial graphite, consisting in heating a mixture of carbon and one or more oxids to a temperature sufficiently high to cause a chemical reaction between the constituents, and by continued heating subsequently volatilizing the non-carbon constituents and causing the carbon to separate in the form of graphite, substantially as described.

6. The method of producing artificial graphite, consisting in electrically heating a mixture of carbon and one or more oxids by causing an electric current to pass through a core surrounded by the mixture to a temperature sufficiently high to cause a chemical reaction and combination of the carbon with one or more non-carbon substances, and continuing the heating and thereby volatilizing the non-carbon constituents and causing the combined carbon to separate in the form of graphite, substantially as described.

7. The method of producing artificial graphite, consisting in heating a mixture of carbon and one or more oxids surrounding a conducting-core, by passing a current of electricity through such core, to a temperature sufficiently high to cause a chemical reaction between the constituents, thereby forming a carbid, and continuing the heating to a degree sufficient to volatilize the non-carbon constituents and separate the carbon of the carbid in the form of graphite, and subsequently employing such graphite as a part of the conducting-core during the continuation of the operation, substantially as described.

In testimony whereof I have signed my name to this specification in the presence of two subscribing witnesses.

EDWARD GOODRICH ACHESON.

Witnesses:
H. H. WILLIAMS,
WM. H. ARISON.